US010807851B2

(12) United States Patent
Zils et al.

(10) Patent No.: US 10,807,851 B2
(45) Date of Patent: Oct. 20, 2020

(54) CRANE MECHANISM AND WORK PLATFORM WITH LOAD DETECTION MEANS AND INTEGRATED INCLINATION SENSOR

(71) Applicant: MOBA Mobile Automation AG, Limburg (DE)

(72) Inventors: Boris Zils, Limburg (DE); Volker Harms, Limburg (DE)

(73) Assignee: MOBA Mobile Automation AG, Limburg (DE)

( * ) Notice: Subject to any disclaimer, the term of this patent is extended or adjusted under 35 U.S.C. 154(b) by 0 days.

(21) Appl. No.: 15/413,289

(22) Filed: Jan. 23, 2017

(65) Prior Publication Data
US 2017/0217746 A1   Aug. 3, 2017

(30) Foreign Application Priority Data

Jan. 28, 2016   (EP) ..................................... 16153100

(51) Int. Cl.
*B66F 17/00*   (2006.01)
*B66F 11/04*   (2006.01)
*G01C 9/02*   (2006.01)
*G01C 25/00*   (2006.01)
*G01L 5/00*   (2006.01)

(52) U.S. Cl.
CPC .......... *B66F 17/006* (2013.01); *B66F 11/044* (2013.01); *B66F 11/046* (2013.01); *G01C 9/02* (2013.01); *G01C 25/00* (2013.01); *G01L 5/0066* (2013.01)

(58) Field of Classification Search
CPC .... B66F 17/006; B66F 11/044; B66F 11/046; G01C 9/02; G01C 25/00; G01L 5/0066
See application file for complete search history.

(56) References Cited

U.S. PATENT DOCUMENTS 3,279,550 A * 10/1966 Kersten ................ G01G 3/1406
                                                177/136
4,456,093 A *  6/1984 Finley ................... B66F 17/006
                                                182/18

(Continued)

FOREIGN PATENT DOCUMENTS

CN   102649532 A   8/2012
CN   203079642 U   7/2013

(Continued)

*Primary Examiner* — Katherine W Mitchell
*Assistant Examiner* — Shiref M Mekhaeil
(74) *Attorney, Agent, or Firm* — Michael A. Glenn; Perkins Coie LLP (57) ABSTRACT

A crane mechanism and a work platform with a load detection apparatus and integrated inclination sensor includes a load cell. The crane mechanism for moving the work platform can be mounted on a base and includes a tiltable boom. The load cell is arranged between the tiltable boom and the work platform as only connection and includes a force sensor and an inclination sensor. The force sensor is configured to detect a force, a lateral or yaw or torsional moment between the crane mechanism and the work platform. The inclination sensor is configured to determine an inclination of the work platform. The force sensor and the inclination sensor have a common housing.

10 Claims, 5 Drawing Sheets

(56) References Cited

U.S. PATENT DOCUMENTS

| | | | | |
|---|---|---|---|---|
| 5,731,987 | A * | 3/1998 | Strong | B66C 23/905 700/302 |
| 5,837,945 | A * | 11/1998 | Cornwell | B65F 3/04 177/136 |
| 8,979,467 | B1 * | 3/2015 | Bailey | B66C 23/62 414/680 |
| 9,120,651 | B1 * | 9/2015 | Bailey | B66C 13/18 |
| 2004/0113575 | A1 * | 6/2004 | Matsuoka | B62D 5/0403 318/437 |
| 2006/0280585 | A1 * | 12/2006 | Passeri | B66F 9/10 414/667 |
| 2007/0084450 | A1 * | 4/2007 | Oka | B60K 28/08 123/675 |
| 2007/0186192 | A1 * | 8/2007 | Wigdor | G01C 9/00 715/864 |
| 2008/0201044 | A1 * | 8/2008 | Yamada | B60K 28/04 701/50 |
| 2009/0301814 | A1 | 12/2009 | Rodnunsky | |
| 2011/0166721 | A1 * | 7/2011 | Castaneda | G05D 1/0255 701/2 |
| 2011/0209943 | A1 | 9/2011 | Bowden | |
| 2012/0211301 | A1 * | 8/2012 | Clark | B66F 11/044 182/2.2 |
| 2013/0110414 | A1 * | 5/2013 | Caponetti | F03G 7/00 702/35 |
| 2015/0308645 | A1 * | 10/2015 | Ishikawa | G01C 9/02 362/466 |
| 2016/0101970 | A1 * | 4/2016 | Taki | B66F 17/003 701/50 |
| 2016/0116500 | A1 * | 4/2016 | Kida | G01P 21/00 73/1.37 |
| 2016/0236922 | A1 * | 8/2016 | Merlo | B66F 9/07559 |
| 2017/0067931 | A1 * | 3/2017 | Takada | G01C 19/5712 |
| 2017/0130429 | A1 * | 5/2017 | Lafrenier | B66C 23/905 |
| 2017/0188514 | A1 * | 7/2017 | Ueda | A01F 12/60 |
| 2017/0234747 | A1 * | 8/2017 | Lipowski | B66F 11/044 182/141 |
| 2018/0194224 | A1 * | 7/2018 | Steinhauser | B62D 1/12 |
| 2019/0010675 | A1 * | 1/2019 | Ogawa | E02F 9/2037 |
| 2019/0194007 | A1 * | 6/2019 | Mourlam | G01C 9/00 |

FOREIGN PATENT DOCUMENTS

| | | |
|---|---|---|
| CN | 104555820 A | 4/2015 |
| EP | 1378482 A1 | 1/2004 |
| EP | 1382562 A1 | 1/2004 |
| EP | 1466862 A1 | 10/2004 |
| EP | 2022749 A1 | 2/2009 |
| FR | 3000200 A1 | 6/2014 |
| JP | 2001-180898 A | 7/2001 |
| KR | 10-20130062118 A | 6/2013 |

* cited by examiner

CRANE MECHANISM AND WORK PLATFORM WITH LOAD DETECTION MEANS AND INTEGRATED INCLINATION SENSOR

CROSS-REFERENCE TO RELATED APPLICATIONS

This application claims priority from European Patent Application No. 16153100.9, which was filed on Jan. 28, 2016, which is incorporated herein in its entirety by this reference thereto.

Embodiments of the present invention relate to a crane mechanism and a work platform with a load detection means and integrated inclination sensor. Generally, the invention is in the field of elevated work platforms, e.g. hydraulic elevated work platforms which are mounted via a crane and a truck and that normally have to be provided with a so-called load detection means.

BACKGROUND OF THE INVENTION

For example, load detection means according to the European patent application EP 1 382 562 A1, which are arranged between the crane mechanism and the work platform, are known.

Further, patent applications EP 1 378 482 A1 as well as EP 1 466 862 A1 each disclose an elevated work platform with a telescopic boom and a work cage arranged at the end of the telescopic boom. Both documents present mechanisms that allow moving the work cage essentially parallel to the ground.

Safety shutdown based on load detection as well as inclination regulation are separate systems, each normally providing at least one sensor in the work cage, such that an individual wiring along the boom and the telescopic boom, respectively, is necessitated for each system. In the first place, this increases the assembly effort when producing elevated work platforms. Further, thick cable harnesses are obstructive during operation. Thus, there is the need for an improved approach.

SUMMARY

According to an embodiment, a crane mechanism and work platform with a load detection apparatus may have: a crane mechanism for moving the work platform, wherein the crane mechanism can be mounted on a base and includes a tiltable boom; and a load cell which is arranged as only connection between the tiltable boom and the work platform, wherein the load cell includes a force sensor that is configured to detect a force, a lateral or yaw moment and/or a torsional moment between the crane mechanism and the work platform; and an inclination sensor that is configured to detect an inclination of the work platform, wherein the force sensor and the inclination sensor have a common housing.

Embodiments of the present invention provide a crane mechanism and a work platform, respectively, with a load detection apparatus. The crane mechanism for moving the work platform can be mounted on a base and includes a tiltable boom. The load detection apparatus includes a load cell. The load cell is arranged between a crane mechanism for moving the work platform and the work platform itself, such that the crane mechanism can move as well as tilt the work platform vertically and/or horizontally. The load cell is arranged as only connection between the tiltable boom and the work platform. The load cell comprises a force sensor and an inclination sensor. The force sensor is configured to detect a force, a lateral or yaw moment and/or a torsional moment between the crane mechanism and the work platform. The inclination sensor is configured to determine an inclination of the work platform, e.g. with respect to the crane mechanism or as absolute reference in relation to the ground, i.e. in relation to gravity. Here, the force sensor and the inclination sensor have a common housing.

The finding of the present invention is that the typically existing load cell with the force sensor is arranged between crane mechanism and work platform, but in particular fixed with respect to the work platform such that the inclination sensor can also be integrated into the same, since the load cell shows the same behavior as the work platform as regards to inclination. By combining these two sensor elements, important synergy effects and cost-savings can be obtained. Merely providing the two sensors in a common housing reduces the assembly effort. Here, the housing forms either the load cell itself but it is also possible that the two sensor elements are arranged in a separate housing within the load cell. Further advantages result with regard to detecting external errors as will be discussed below.

According to the embodiments, the load detection apparatus includes one or several strain gauges for force measurement. These strain gauges are configured to determine tension in the deposited material and to determine, starting therefrom, a value for the load between the crane mechanism and the boom, respectively, and the work cage. According to embodiments, several strain gauges are provided, such that redundant monitoring is possible.

The boom can, for example, be a telescopic boom or a fixed boom to which the tiltable boom for tilting the work platform is mounted. This tiltable boom can, for example, be operated by a levelling cylinder. The tiltable boom is typically oriented in dependence on the inclination sensor signal, such that the work platform is essentially parallel to the ground or essentially perpendicular to gravity.

Different variations for implementing the inclination sensor exist. According to the first embodiment, the inclination sensor can be comparable to a spirit level and can determine an absolute inclination with regard to gravity, e.g. by means of a capacitively monitored pendulum. Alternatively, according to further embodiments, the inclination sensor can also be configured as angle sensor determining the tilting between the telescopic boom/fixed boom and the tiltable boom.

According to embodiments, in particular for reducing the wiring effort, both the force sensor and the inclination sensor are controlled with a common signal line and/or even a common energy supply.

As already explained above, according to embodiments, the force sensor can be implemented in a redundant manner. According to embodiments, it is also possible to implement the inclination sensor in a redundant manner. According to embodiments, within the load detection means, only one current supply (power supply) as well as one microcontroller per "channel" will be provided for evaluating the sensor measurement values. All these measures have, on the one hand, advantages as regard to reducing the wiring effort (i.e. the assembly effort) on the machine. Not only the effort itself, but also the wiring is simplified, which reduces the entire complexity.

According to further embodiments, the load cell can be connected to an evaluation unit that is part of the load detection apparatus. Here, it should be noted that the evaluation unit does not necessarily have to be arranged within the load cell. Due to the fact that both the one or several force sensors or the one or several inclination sensors are evaluated with evaluation electronics which is accommodated in one and the same evaluation unit, it is also possible to calibrate all these sensors simultaneously. Thus, according to further embodiments, the evaluation unit can be configured to perform a common calibration method, e.g. for calibrating the temperature behavior for all sensors. This saves costs for personnel and devices, both during production and during operation.

According to additional embodiments, the inclinations sensor can also be implemented as acceleration sensor. This results in the advantage that acceleration of the work platform can also be detected for inferring an external error (for example driving over a curb with resulting swinging up and down or reciprocating of the crane mechanism and the work platform). Thus, the evaluation unit can be configured to detect an external error during a load change detected by means of the force sensor and an acceleration detected by means of the acceleration sensor and, based thereon, to put the sensors in some sort of latency state and to ignore their signal for a certain time period (0.5 s or 1 s).

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present invention and the figures will be discussed in detail, it should be noted that the same elements and structures are provided with the same reference numbers such that the description of the same is inter-applicable and inter-exchangeable, respectively.

Figure 1:
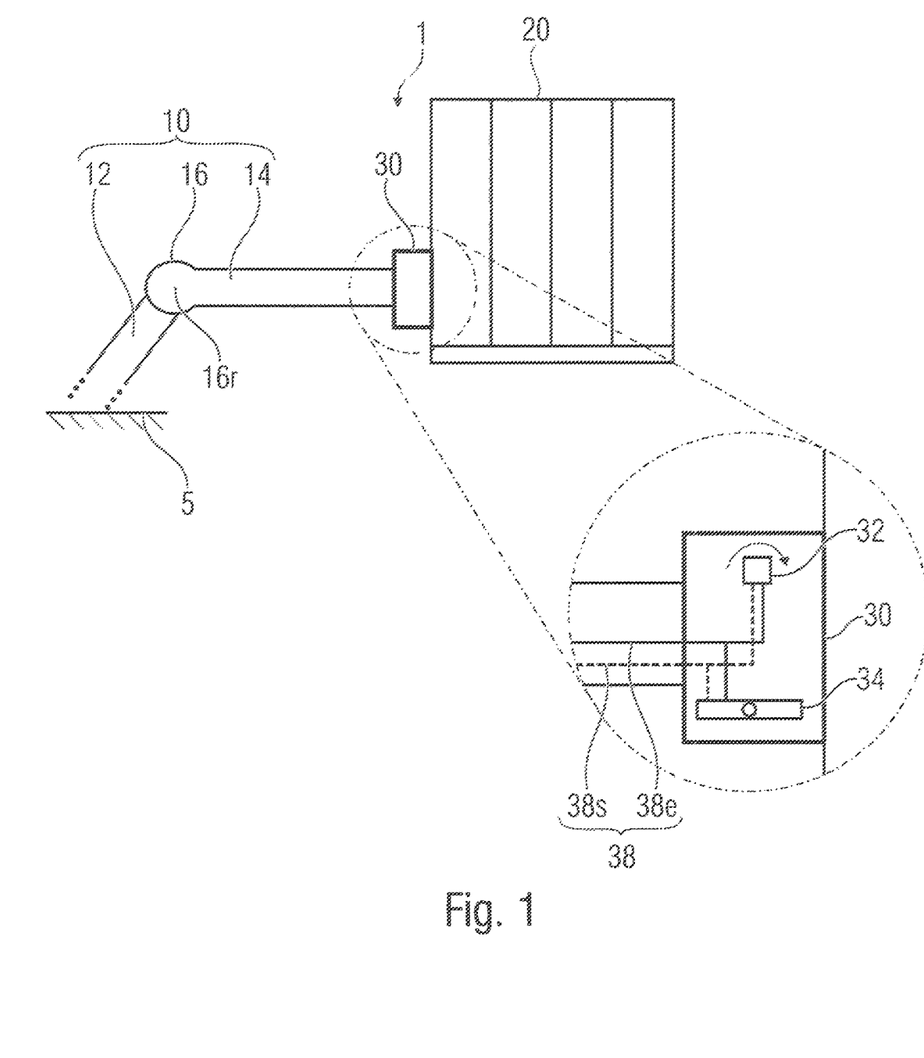
FIG. 1 is a schematic block diagram of a load detection apparatus for a crane mechanism and a work platform, respectively, according to embodiments.

FIG. 1 shows a crane mechanism 10 with a work cage 20 and a load cell 30 arranged between the crane mechanism 10 and the work cage 20, which forms the load detection means 1. The crane mechanism 10 can be mounted (tiltably or rotatably) on a base 5, e.g. a mobile trailer or a semi-trailer.

In this embodiment, the crane mechanism 10 includes a (stationary) boom 12 which is connected to a tiltable boom 14 via a hinge 16. The hinge 16 allows tilting of the tiltable boom 14 and hence the cage 20 as well as the load cell 30 with respect to the boom 12 around the axis of rotation 16a. By implication, when the cage 20 is tilted, the load cell 30 is also tilted accordingly.

The load cell 30 is arranged between the cage 20 and the tiltable boom 14 and consequently configured to determine bending moments and shear forces but also compressive forces between the boom 14 and the work cage 20. Subsequently, based on the enlarged representation of the load cell 30, both the force sensor 32 and the inclination sensor 34 will be discussed.

The force sensor 32 is based, for example, on the determination of a deformation of the load cell 30 and the housing, respectively, or another deformation device of the load cell 30. The deformation is determined via a strain gauge (resistive force transducer) or a different force transducer, such as a piezo force transducer and used as measure for the load, since the deformation depends (directly) on the load weighing on the work cage 20. Thus, the deformation depends on the loading of the cage 20, wherein the material parameters of the deformation body have to be considered as well. Thus, in a calibration process of the load cell and the deformation body, respectively, this dependency between loading and deformation of the deformation body is determined in advance.

Here, it should be noted that depending on how the load cell is arranged with respect to the work cage (on the side or below), different deformation bodies exist, since this depends on whether it is a torsion or compressive force. Examples for such deformation bodies are S-shaped spring bellows, bending beams or ring torsion springs, as will be discussed in more detail in FIGS. 2a-2d.

Additionally, the inclination sensor 34 is also integrated in the load cell 30. The inclination sensor 34 can be arranged, for example, with respect to the horizontal and/or the vertical of the load cell 30 and the work cage 20, respectively. Since the load detection means 30 and the load cell 30, respectively, is firmly connected to the cage 20, the inclination sensor of the load detection means measures the same inclination angle as a separate inclination sensor. Thus, this inclination sensor 34 detects the inclination of the load cell 30 and hence also the inclination of the work cage 20, such that the same can be compensated, for example, by means of the crane mechanism. The inclination sensor 34 can, for example, include a body similar to a plummet which is monitored electronically, inductively, capacitively or optically in order to determine its position with respect to gravity. Further, liquid-based systems imitating a spirit level are also known.

According to embodiments, the sensors 32-34 of the load cell 30 are connected to a common line 38 via which the two sensors 32 and 34 are commonly supplied with energy (cf. reference number 38e). Further, alternatively or additionally to the energy line 38e, a signal line 38S can be provided in the signal body 38, via which the signals determined by means of the sensors 32-34 are provided to further means, such as the control means of the elevated work platform.

In the following, with reference to FIG. 2a-d, different positions of the load cell with respect to the work cage 20 will be discussed.

Figure 2A:
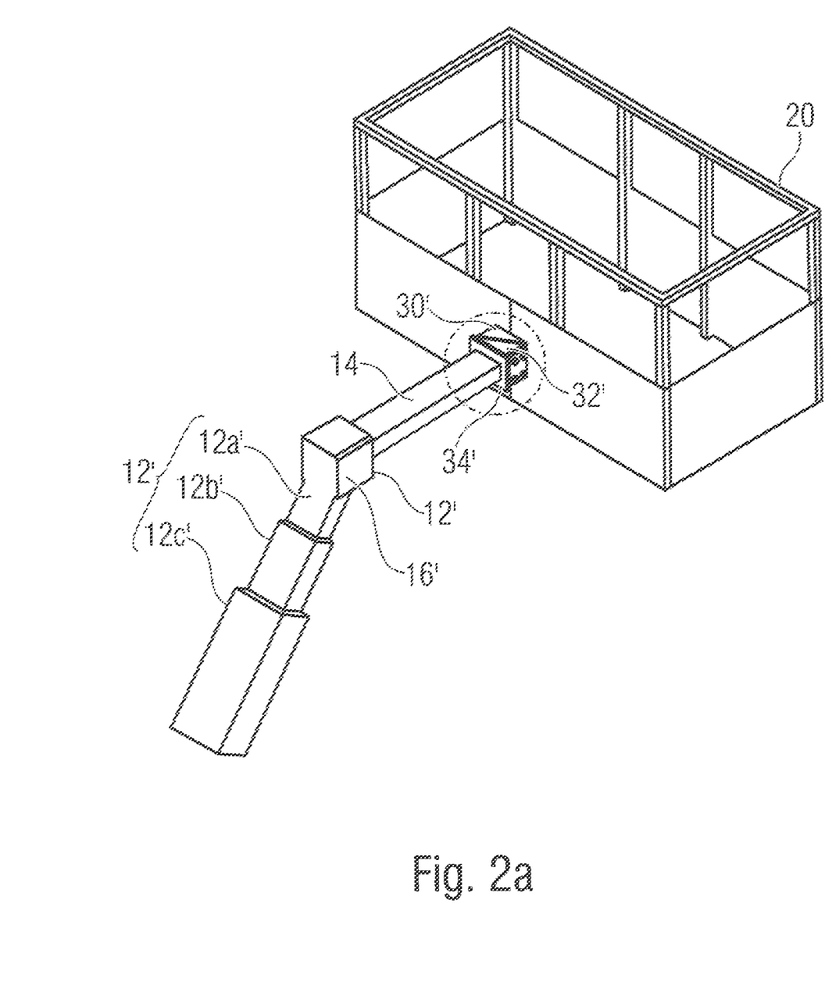
FIG. 2a-2d are schematic three-dimensional figures of a crane mechanism, a work platform and a load cell arranged therebetween including the force sensor and the inclination sensor, according to embodiments.
Figure 2B:
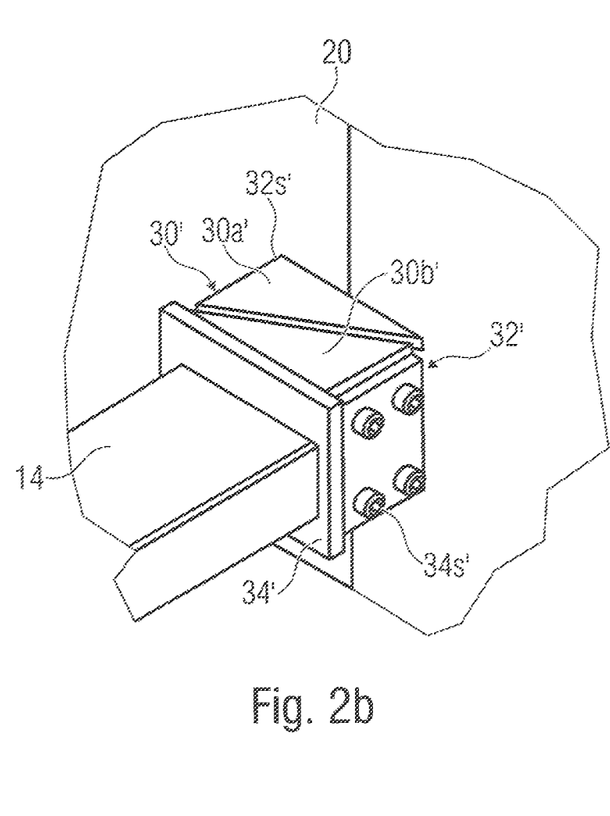
Figure 2C:
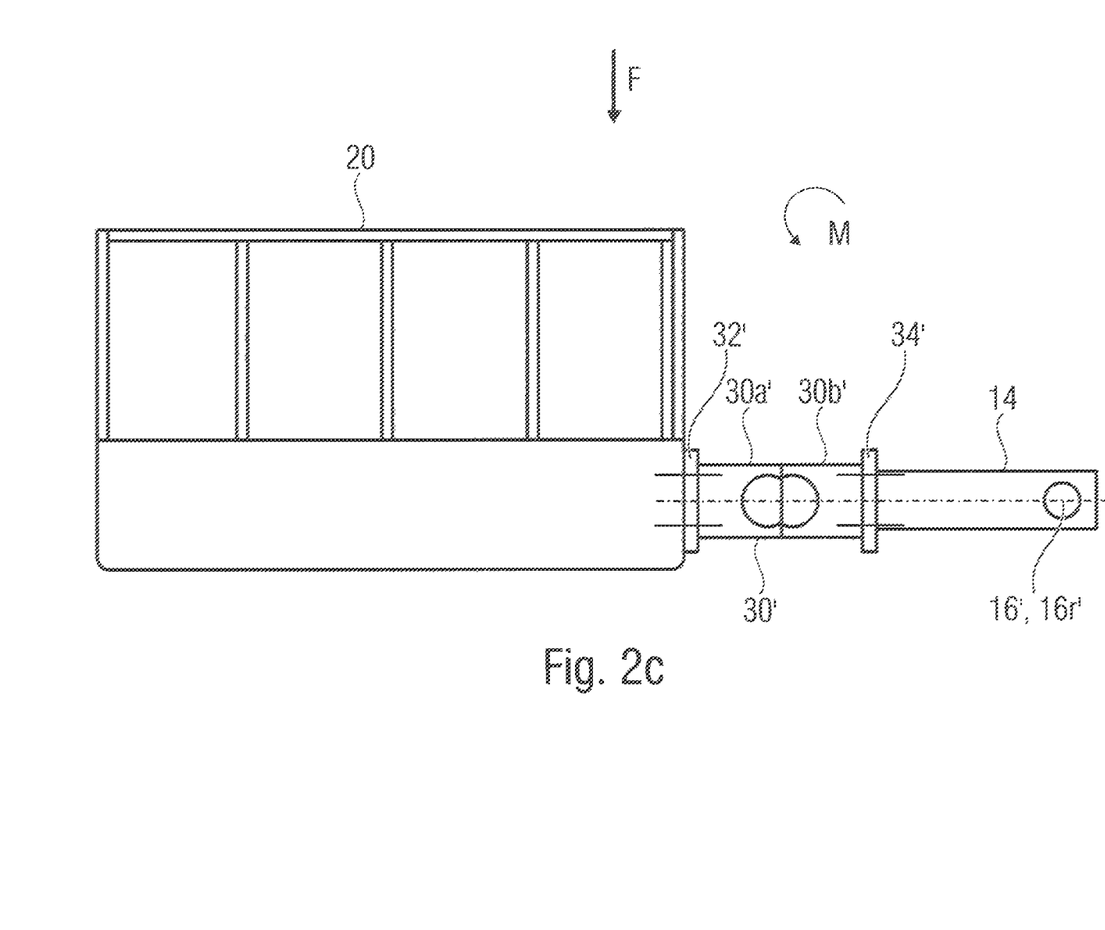

FIGS. 2a-2c illustrate the lateral arrangement of a load cell 30' with regard to the work cage 20. For completeness sake, it should be noted that the load cell 30' includes both the force sensor (here, for example a bending beam sensor) as well as the inclination sensor (here, for example, a plummet sensor).

The load cell 30' includes a first flange 32' for the work cage as well as a second flange 34' for the movable boom 14. The two flanges 34' and 32' are configured by means of so-called angle plates, such that screw fitting can be performed from the side (cf. reference numbers 34s' and 32s'). Thus, each flange 32' and 34' is laterally connected to a half 38a' and 30b', respectively, of the load cell by means of the screw connection 32s' and 34s', respectively.

The two halves 30a' and 30b' are connected to one another via a deformation element (not illustrated) in which the actual force sensors (DMS) are arranged. As can be seen, in particular in FIG. 2c, bending of the load cell 30' in the region between the two halves 30a' and 30b' results from a force F on the work cage 20 (cf. bending moment M). The bending moment M can be determined by means of the force sensor from which again the force F can be inferred (either mathematically or based on empirical values).

The horizontal cage illustrated in FIG. 2c can be tilted around the hinge joint 16' and, to be more accurate, around the axis of rotation 16R'. For this, the tiltable boom 14 is tilted with respect to the boom 12', in this embodiment configured as telescopic boom (cf. telescopic elements 12a', 12b' and 12c'). This tilting and inclination, respectively, is determined by means of the inclination sensor that has been discussed with regard to FIG. 1, such that the inclination can be compensated, for example with a hydraulic levelling cylinder arranged in the area of the joint 16'.

This control of the inclination starting from the sensor signals is performed by a control connected to the evaluation unit of the load detection apparatus. Here, it should be noted that both the control and the load evaluation apparatus are advantageously not arranged on the boom or the work cage but on the (vehicle) base of the work platform.

Figure 2D:
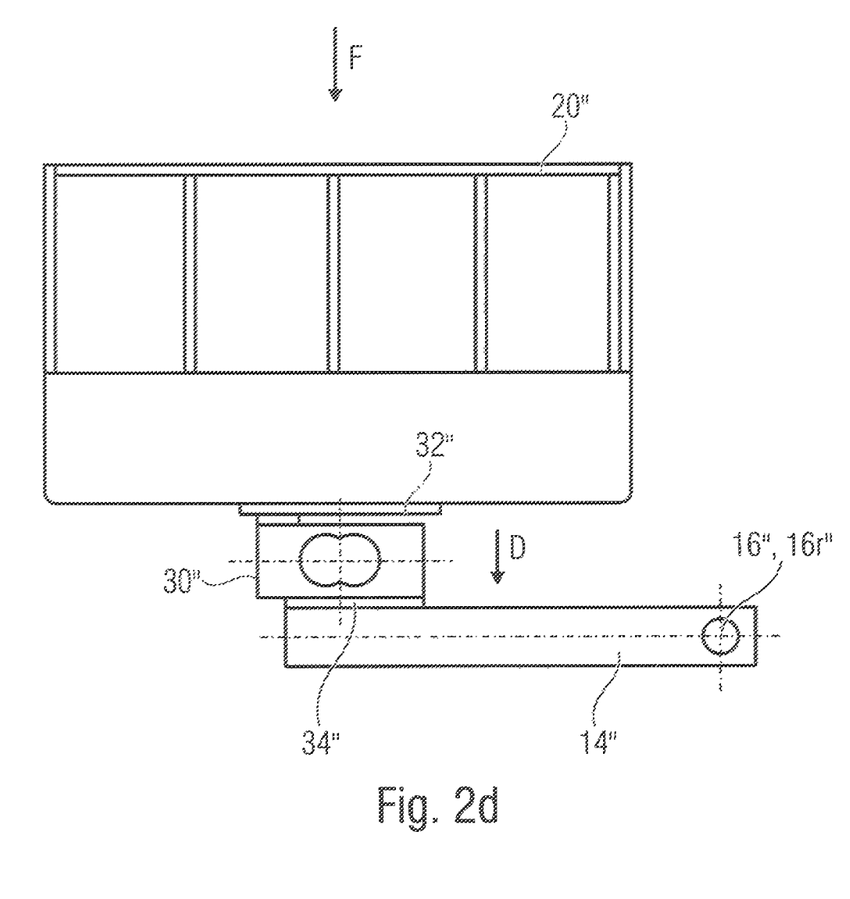

FIG. 2d shows a work cage 20" connected to the boom 14" via a load cell 30" provided below the work cage 20". The connection is made via the two flanges 32" on the side of the work cage 20" and 34" on the side of the boom 14".

Due to the fact that boom 14", load cell 30" and cage 20" are stacked on top of one another, a compressive force (cf. arrow D) is exerted on the load cell 30" when the work cage 20 is loaded (cf. arrow F). As a result, this compressive force D is used as a measure for the load F. Obviously, the load cell 30" again includes the inclination to the sensor (not illustrated), which measures the inclination of the load cell 30", which is the same due to the fixed connection to the cage 20" and the boom 14". For completeness' sake, it should be noted that the boom 14" is again tiltable around the joint 16" and the pivot point 16R", respectively.

According to further embodiments, as indicated above, the load detection apparatus, includes an evaluation unit that is connected to the load cell and in particular to the two sensors 32 and 34 (cf. Fig.) of the load cell 30. According to further embodiments, the evaluation unit can be configured to detect the two sensors simultaneously. Here, the evaluation unit can also be arranged in the same housing where the two sensor elements force sensor and inclination sensor are arranged. I.e., if the load cell itself forms the housing, the evaluation unit can also be arranged within the load cell apart from the two sensor elements. If, however, the two sensor elements are arranged in a separate housing within the load cell, the evaluation unit can also be arranged within this housing.

According to embodiments, it is also possible that at least the force sensor or the inclination sensor, but advantageously both sensors are configured in a redundant manner.

Even when it is assumed in the above embodiments that a bending moment or a compressive force is determined by means of the force sensor for determining the load on the work cage, it should be noted that also further forces, such as a lateral or yaw moment or a torsional moment are significant with regard to a load on the work cage when the same are accordingly arranged between the boom and the work cage.

Even when in the above embodiments the usage of strain gauges as force sensors has been assumed, it should be noted that also other measurement principles can be used. One example is the so-called vibrating wire measurement principle. With a vibrating wire load measuring device, amounts can be measured that can be transferred to the tension force of a wire (e.g. to a wire spanned in the measurement cell for determining a load on the measurement cell). For this, the wire in the measurement cell is excited to vibrate, wherein the wire is detuned due to a load by the force to be measured, such that starting on the amended natural frequency of the wire the load onto the same can be determined.

According to embodiments, with reference to FIG. 1, instead of the absolute inclination sensor 34, a relative inclination sensor can be provided that is coupled to the joint 16 and determines the tilting angle between the boom 12 and the tiltable boom 14.

Starting from the combination of load sensor and inclination sensor, according to further embodiments, a further application results, which will be discussed with reference to FIG. 3. Here, it should be noted that an inclination transducer is an acceleration sensor which is mainly configured to detect acceleration acting on the sensor element(s) as change of inclination but which can also detect acceleration in at least one direction in space.

In the currently used load measurement cell (without integrated inclination sensor), a change of weight (possibly also an overload) is detected even when the platform is moved during operation, for example drives over a curb. Then, the telescopic boom arm will start swinging, which indicates a change of weight of the cage although the weight of the cage has remained the same. In that case, the inclination transducer arranged at the telescopic arm will only indicate a minimum or no change of inclination, since the measured inclination value is output in an acceleration-compensated manner, i.e. acceleration acting on the inclination sensor is filtered out.

The same problem as when driving over the curb also occurs when extending or retracting the telescopic boom arm since acceleration acts on the load measurement cell until the time when an even moving velocity is obtained. Up to now, such occurring load changes are dealt with by a machine control such that a load change can only be detected securely when the same is pending over a time x, i.e. exists, for example, for several seconds. Only then a change of weight or overload can be assumed with high probability. However, this does not significantly increase the error reaction time of the system.

By integrating the inclination sensor into the load cell, the influence of the acceleration acting on the load cell can be eliminated as will be explained based on FIG. 3.

Figure 3:
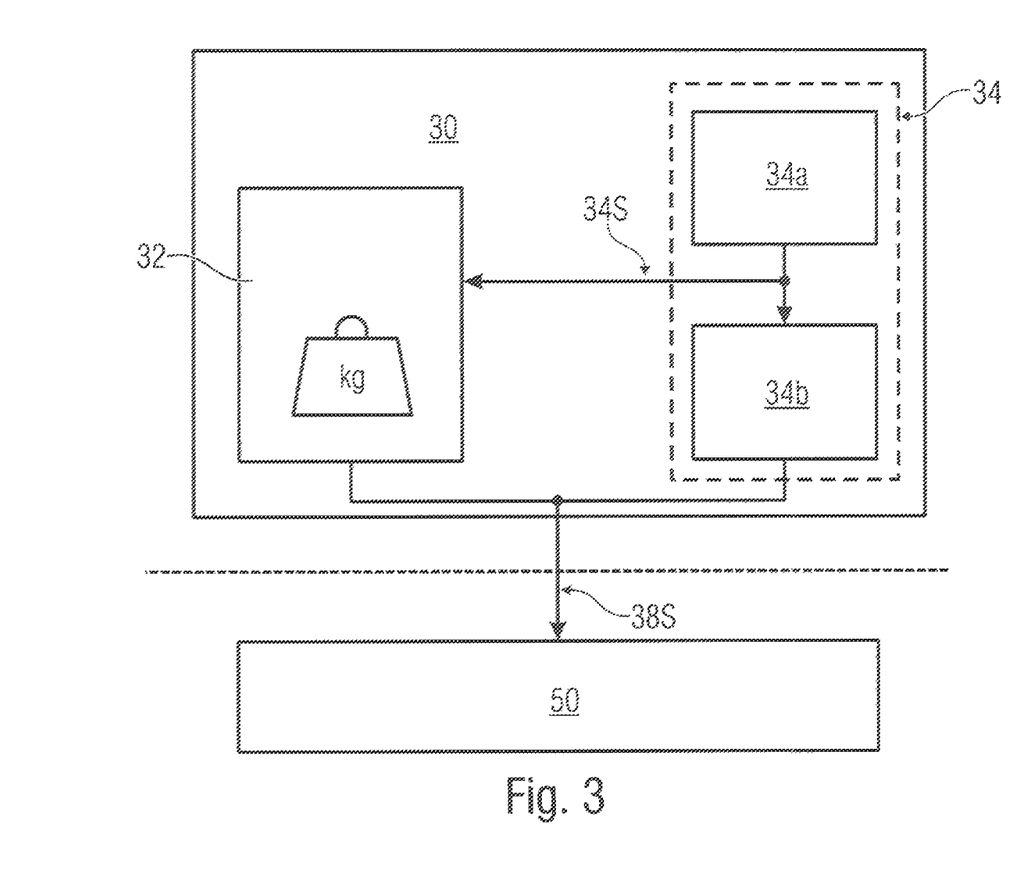
FIG. 3 is a schematic figure of a load detection apparatus according to extended embodiments.

FIG. 3 shows a schematic block diagram of the load cell 30 with integrated inclination sensor 34. Here, reference number 34a indicates one or several sensor elements for inclination and acceleration measurement. Advantageously, two MEMS sensors offset by 90 degrees are used, which, however, measure an inclination in only one axis. Thus, the raw measurement value is the not yet acceleration-compensated signal. Compensation is only performed by the downstream filter 34b. The raw measurement value is provided to the force sensor 32 via the signal line 34S, which can then derive from this signal whether acceleration acts on the load cell 30 (for example by driving over a curb, etc.) or whether an actual change of weight of the cage exists. The acceleration-compensated inclination value is transmitted to the evaluation unit 50 via the common signal line 38S.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A system comprising a crane mechanism and a work platform with a load detection apparatus, comprising:
the crane mechanism for moving the work platform, wherein the crane mechanism can be mounted on a base and comprises a tiltable boom;
a load detection apparatus which is arranged as only connection between the tiltable boom and the work platform, wherein
the load detection apparatus comprises a force sensor that is configured to detect at least one of the group consisting of a force, a lateral or yaw moment and a torsional moment between the crane mechanism and the work platform; and
an acceleration sensor used as inclination sensor and configured to detect an inclination of the work platform, wherein
the force sensor and the inclination sensor comprise a common housing; and
an evaluation unit for evaluating the force sensor and the acceleration sensor as the inclination sensor and wherein the evaluation unit is configured to detect an external error when the force sensor detects a load change and the acceleration sensor detects an acceleration when said load change and said acceleration occur simultaneously, wherein the evaluation unit is configured to put the sensors in a latency state so as to ignore signals of the sensors for a certain time period.

2. The system according to claim 1, wherein the force sensor comprises one or several strain gauges.

3. The system according to claim 1, wherein the crane mechanism comprises a further boom and at least one hinge joint.

4. The system according to claim 3, wherein the further boom is a telescopic boom or a fixed boom which is connected to the tiltable boom via the hinge joint.

5. The system according to claim 1, wherein the inclination sensor is the acceleration sensor or is configured to determine the inclination in relation to the ground or in relation to gravity.

6. The system according to claim 1, wherein the load detection apparatus is disposed below or on the side of the work platform and is connected to the work platform such that the load detection apparatus is tilted together with the work cage.

7. The system according to claim 1, wherein the force sensor and the inclination sensor are provided in the load detection apparatus in a redundant manner comprising a first and a second force sensor as well as a first and a second inclination sensor.

8. The system according to claim 7, wherein the first force sensor and the first inclination sensor are connected via a common signal line to an evaluation unit or via a common energy supply line to a common energy supply unit, and
wherein the second force sensor and the second inclination sensor are connected via another common signal line to the evaluation unit or via another common energy supply line to the common energy supply unit.

9. The system according to claim 1, wherein the load detection apparatus comprises an evaluation unit for evaluating the force sensor and the inclination sensor.

10. The system according to claim 9, wherein the evaluation unit is configured to calibrate both the force sensor and the inclination sensor in a common calibration method.

* * * * *